US010200158B2

(12) United States Patent
Rainish et al.

(10) Patent No.: US 10,200,158 B2
(45) Date of Patent: Feb. 5, 2019

(54) METHOD AND DEVICE FOR OPERATING UNDER EXTREMELY LOW SIGNAL-TO-NOISE RATIO

(71) Applicant: SATIXFY ISRAEL LTD., Rehovot (IL)

(72) Inventors: Doron Rainish, Ramat Gan (IL); Avraham Freedman, Tel Aviv (IL)

(73) Assignee: SATIXFY ISRAEL LTD., Rehovot (IL)

( * ) Notice: Subject to any disclaimer, the term of this patent is extended or adjusted under 35 U.S.C. 154(b) by 0 days.

(21) Appl. No.: 15/747,621

(22) PCT Filed: Jul. 14, 2016

(86) PCT No.: PCT/IL2016/000014

§ 371 (c)(1),
(2) Date: Jan. 25, 2018

(87) PCT Pub. No.: WO2017/017667

PCT Pub. Date: Feb. 2, 2017

(65) Prior Publication Data

US 2018/0212715 A1 Jul. 26, 2018

Related U.S. Application Data

(60) Provisional application No. 62/198,237, filed on Jul. 29, 2015.

(51) Int. Cl.

*H04L 1/08* (2006.01)
*H04L 1/00* (2006.01)
*H04L 27/00* (2006.01)

(52) U.S. Cl.

CPC .............. *H04L 1/08* (2013.01); *H04L 1/0002* (2013.01); *H04L 1/0007* (2013.01); *H04L 1/0072* (2013.01); *H04L 27/0008* (2013.01)

(58) Field of Classification Search

CPC ....... H04L 1/08; H04L 1/0002; H04L 1/0007; H04L 1/0072; H04L 27/0008

See application file for complete search history.

(56) References Cited

U.S. PATENT DOCUMENTS

2010/0128660 A1 5/2010 Becker et al.
2010/0128661 A1 5/2010 Becker et al.

(Continued)

FOREIGN PATENT DOCUMENTS

EP 2503725 A1 9/2012

OTHER PUBLICATIONS

Digital Video Broadcasting (DVB),"Second generation framing structure channel coding and modulation systems for Broadcasting,Interactive Services News Gathering and other broadband satellite applications", Part II: S2-Extensions (D VB-S2X)-(Optional)DVB Document A83-2 ,<https://www.dvb.org/resources/public/starldards/a83-2_dvbs2x_den302307-2.pdf> EBU/ETSI/CENELEC JTC Broadcast (Mar. 2014).

(Continued)

*Primary Examiner* — Un C Cho
*Assistant Examiner* — Jeremy M Costin
(74) *Attorney, Agent, or Firm* — Browdy and Neimark, PLLC

(57) ABSTRACT

A method and a device are provided for use at one or more links of a communication network along which communications are exchanged under extremely low SNR conditions. The method comprises a step of transmitting an extended communication frame, which comprises a plurality of basic frames, wherein each of the plurality of basic frames included in the extended frame, comprises the same payload as all other basic frames included in the plurality of basic frames.

17 Claims, 2 Drawing Sheets

EXTENDED FRAME
EXTENDED FRAME
EXTENDED FRAME
16686
...
TIME
ANCHOR
NEW EXTENDED FRAME
PREAMBLE
HEADER
DATA PAYLOAD AND PILOT SIGNALS

(56) References Cited

U.S. PATENT DOCUMENTS

2013/0195148 A1 8/2013 Kim et al.
2014/0010242 A1 1/2014 Koo et al.
2014/0082675 A1 3/2014 Kim et al.
2016/0149627 A1* 5/2016 De Gaudenzi ....... H04B 7/0615 370/329
2016/0182189 A1* 6/2016 Stadali .................. H04L 1/0003 370/474

OTHER PUBLICATIONS

Chinese Search Report of Corresponding application No. 2016800442644 dated Aug. 23, 2018.
European Search Report of EP16829950 dated Aug. 17, 2018.

* cited by examiner

METHOD AND DEVICE FOR OPERATING UNDER EXTREMELY LOW SIGNAL-TO-NOISE RATIO

FIELD OF THE DISCLOSURE

The present disclosure relates to the field of communications and in particularly to communications exchanged in a satellite communications network.

BACKGROUND OF THE DISCLOSURE

Since their introduction, communication satellites provide a platform for communications over links extending over a long range having a very wide area coverage. Satellites provide an excellent solution for applications like broadcasting, video transmission, telephony, data trunking and others.

For other applications, such as sensor networks or remote infrastructure monitoring such as water, gas and electricity facilities metering, satellites may provide an excellent solution for the communications needs associated with these applications. The very large coverage area of a satellite enables such a system to use a single hub in which data from a continent size region can be collected. The spectral requirements from such systems, being mainly for communications at a relatively very low rate, make it possible to operate with a limited amount of satellite spectral resources, even under very poor SNR conditions. On the other hand, in many cases, equipment size and power requirements present an obstacle for implementing a satellite communication terminal, which typically has a relatively large footprint from both size and power aspects.

The requirement for a small size terminal implies directly that a small antenna and small electronic equipment size, should be used. A smaller antenna affects the link budget, yet, the fact that the data rate requirement, and consequently the respective bandwidth requirement, are both low, makes it possible to still be able to operate in a very low Signal to Noise ratio (SNR) conditions. The VLSNR mode of the new DVB-S2X standard enables operation in an SNR as low as −10 dB.

Therefore, the problem which the present invention seeks to solve is how to provide an air interface that enables operating under conditions where the SNR is even lower than the −10 dB value referred to above. Such an extremely low SNR is referred to herein throughout the specification and claims as Extremely Low Signal to Noise Ratio ("EL-SNR"). In other words, how to enable operation under conditions where the SNR is for example as low as say −30 dB, at the expanse of the data rate.

SUMMARY OF THE DISCLOSURE

Therefore, it is an object of the present invention to provide a method and a device to enable communication under extremely low SNR conditions in a satellite communication network.

It is another object of the present invention to provide a novel method and device that enable receiving communications from a plurality of users.

Other objects of the present invention will become apparent as the description of the invention proceeds.

Therefore, according to a first embodiment of the present invention, there is provided a transceiver adapted to exchange communications along one or more communication links at which communications are exchanged under extremely low SNR conditions, wherein upon transmission, the transceiver is configured to transmit a plurality of extended communication frames, each of which comprises a plurality of basic frames, where each of the plurality of basic frames included in a respective extended communication frame comprises the same payload as all other basic frames included in that plurality of basic frames, whereas upon reception, the transceiver combines the reception signals received for the plurality of basic frames and to extract the transmitted information therefrom.

A "basic frame" as used herein, is a signal limited in duration, created by modulating some information for its transmission over the medium. The information may include payload data as well as information required for proper operation of the communication link. The basic frame may be for example a Standard compliant frame (i.e. defined by a communication protocol).

As known in the art, a basic frame is a frame that comprises symbols. The term "symbol" as used herein is used to denote a segment of time, in which the waveform is generated according to a set of payload bits. For example, according to the DVB-S2X standard, a set of M bits modulates the waveform according to a $2^M$APSK modulation. When implementing other standards, the symbol may be modulated differently, or even be a combination of waveforms.

The term "transceiver" as used herein throughout the specification and claims should be understood to encompass the following options: a device used for transmission only, a device used for reception only (e.g. used in cases of a one-way communication), as well as the option of a device used for both transmission and reception. All these three options are hereby covered by the term transceiver and the applicable option depends on the implemented network configuration. An extended frame which comprises N basic frames will therefore include N times of the same data payload, whereas the N basic frames' headers are not all necessarily the same. Typically, some of the basic frames' headers will be the same, while few others will be different.

The term "combining" as used herein with relation to data extracted from the basic frames of an extended frame, refers to methods and techniques implemented by the transceiver on reception, in order to extract from the extended frame the information contained in each of the plurality of the basic frames included in that extended frame. The combining methods include, but are not limited to, summation and averaging of the signals extracted from all the basic frames, summation and averaging of a corrected version of the signals, where such a correction may be implemented according to known frequency errors, timing errors and other distortion which the received signal might have undergone.

The terms "extended frame" and "extended communication frame" as used herein, are used throughout the specification and claims as interchangeable terms, each having the same meaning as the other.

According to another embodiment, the transceiver is further configured to affect code shortening and spreading to at least one of the plurality of basic frames included in the extended communication frame.

In accordance with another embodiment, the transceiver is further configured to receive a plurality of extended communication frames, each of which comprises a plurality of basic frames, where each of the plurality of basic frames included in a respective extended communication frame comprises the same payload as all other basic frames included in that plurality of basic frames, and to decode therefrom data payload comprised in the plurality of basic frames included in the extended communication frame.

According to another aspect of the disclosure there is provided a method for use at one or more links of a communication network (e.g. a satellite communication network) along which communications are exchanged under extremely low SNR conditions, the method comprises a step of transmitting an extended communication frame, which comprises a plurality of basic frames, wherein each of the plurality of basic frames included in the extended frame, comprises the same payload as all other basic frames included in that plurality of basic frames.

In accordance with another embodiment of this aspect of the disclosure, the method provided further comprising a step of implementing a code shortening and spreading to at least one of the plurality of basic frames included in the extended communication frame.

By yet another embodiment of this aspect of the disclosure, the method provided further comprises a step of incorporating headers and pilot signals at pre-defined intervals within the extended communication frame.

According to still another embodiment, the method further comprises a step of extending a header length of one or more basic frames comprised in the extended communication frame.

In accordance with another embodiment, the method further comprises a step of combining the header symbols over a set of basic frames, and storing symbols associated with preceding basic frames.

By still another embodiment, the method further comprises a step of identifying a basic frame as being the last basic frame of the extended frame.

According to yet another embodiment, the method further comprises a step of applying a scrambling sequence across the extended frame, preferably, while refraining from initializing the scrambling sequence at the beginning of basic frames comprised in the extended frame.

In accordance with another embodiment, an extended communication frame is configured to carry communications received from a number of different users. Preferably, for each of at least two basic frames received from different users, a different scrambling sequence is applied prior to incorporating the respective basic frames within a single extended communication frame.

BRIEF DESCRIPTION OF THE DRAWINGS

The present invention will be more fully understood from the following detailed description of the embodiments thereof, taken together with the drawings in which.

DETAILED DESCRIPTION OF THE DISCLOSURE

In the following description, for the purposes of explanation, numerous specific details are set forth in order to provide a better understanding of the present invention by way of examples. It should be apparent, however, that the present invention may be practiced without these specific details.

The solution provided by the present disclosure enables exchanging communications under extremely low SNR conditions in a communication network, such as a satellite communication network. One of the main underlying principles of the present solution, is, that instead of transmitting a basic frame towards the other end of the link (which operates under ELSNR), an extended frame is transmitted, whereas that extended frame comprises a pre-defined number of repetitions of the payload comprised in the original basic frame.

Obviously, by following the solution provided by the present invention, the total amount of data which is included within such an extended frame, is by far less (depending on the number of times that the same payload is repeated) than the amount of data that could have been transmitted during the same period of time at which the extended frame is transmitted, had each basic frame been transmitted only once (i.e. its payload would not have been re-transmitted to form the extended frame, as the proposed mechanism results in reducing the data transmission rate by a factor that is essentially equal or greater than the number of repetitions). Yet, when such an extended frame is received by the other end receiver, the SNR associated with the received data, may be increased (by that factor), by applying for example an appropriate combining technique, provided that the noise and interference associated with each of the repetitions are independent of these repetitions.

Figure 1:
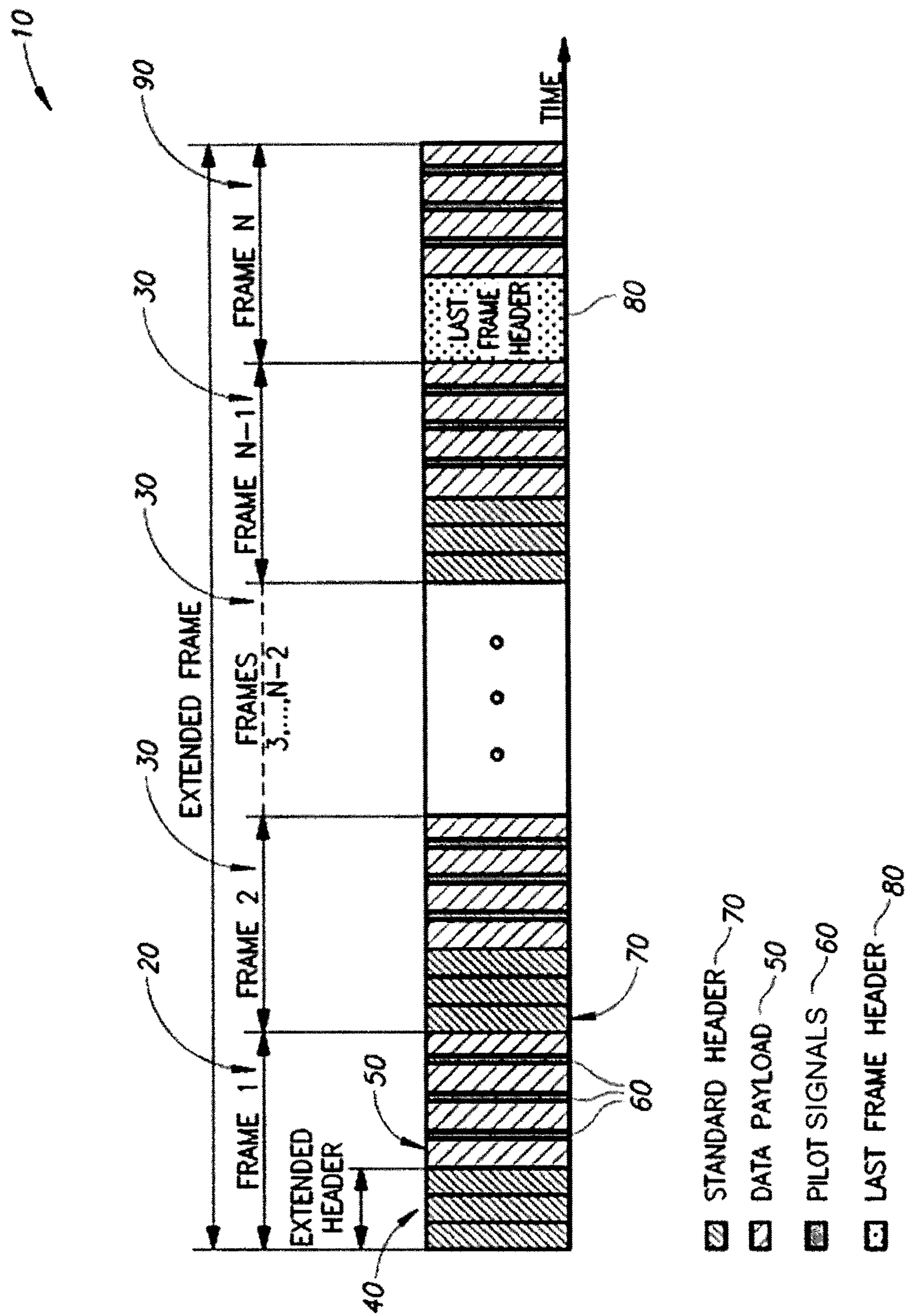
FIG. 1 exemplifies an extended frame construed in accordance with an embodiment of the present invention.

FIG. 1 exemplifies a structure of such an extended frame (10) comprising N frames, out of which the first basic frame (20) is a basic frame carrying a certain data payload, and its N−1 consecutive basic frames (30), each comprising the same data payload as that of the first basic frame (20). These N−1 consecutive basic frames (30) will be referred to hereinbelow as repetitions of the first basic frame (20), even though, as will be appreciated by those skilled in the art, their other parts, such as their headers and/or pilot signals associated therewith, are not necessarily the same as that of the first basic frame.

In this example, the first basic frame (20) includes a header (40) of the extended frame (10) (preferably, having a length of a standard compliant header), which precedes the payload (50) of the first basic frame.

Optionally, certain pilot signals (60) are incorporated in each of the N−1 repeated data payloads included within the extended frame (10). Following the first payload (50), the extended frame (10) includes a first repetition (being the second basic frame) out of the N−1 repetitions of the basic frame. According to the present example, this first repetition includes a standard compliant header (70) and the same pilot signals (60) comprised in the first basic frame.

The term "standard header" or "standard compliant header" (as header 70) is used to denote a control information needed for decoding the rest of the basic frame which is 90 to 900 symbols long in the case of the DVB-S2/S2X Standard. However, as will be appreciated by those skilled in the art, the header of the extended frame is not necessarily of that length and it may be longer. One way of achieving a longer header for the extended frames, is by using a number of standard headers, each associated with a respective basic frame, and the combination of these number of headers is in fact the header for the extended frame. This may be done by repeating the standard header a few times.

According to another embodiment of the present disclosure, a longer header may be obtained by adding a set of known symbols to a standard header, which would be a common set for all the transmitted frames.

In other words, the method according to this embodiment for obtaining the modified header may comprise for example the following steps:

1. providing a first data payload that needs to be transmitted in a modulated form.
2. generating a basic data frame that comprises the modulated first data payload and a header associated with the frame (i.e. indicating how the first data payload was modulated and framed) and a known preamble.
3. repeating the basic data frame N times, thereby creating an extended frame associated with that data payload.
4. steps 1. to 3. are then repeated for a second data payload which is obviously different from the first data payload, the header may be different but the preamble remains the same as in the preceding basic frame case with the extended frame generated for the first data payload.

This additional set of symbols, referred to herein as a preamble, may be of assistance for the receiver in synchronizing and adapting the received signal, for example as described below in the section entitled "Fixed Grid and Implementation for Pilots and Headers". As will be appreciated by those skilled in the art, other alternative applicable methods, that are known in the art per se, may be used in order to facilitate the receiver operation of synchronizing and adapting the received signal.

Following this second basic frame (comprising the first repetition of the payload (30) of the first frame (20)), the extended frame (10) comprises additional N−2 repetitions of the first basic frame (20), each comprising the same payload (50) as that of the first basic frame (20), the same pilot signals (60) as the first basic frame (20) and a standard header (70).

The header (80) of the last repetition (90) of the first basic frame (20) is different from the headers of the preceding frames, and will be referred to hereinbelow as the last frame header. This last frame header (80) is used for the receiving end as an indication that the end of this basic frame (90) is also the end of extended frame (10).

As an example, let us consider Table 1 below which presents ideal results that may be obtained by using the frame repetition mechanism described above. In this example, the basic frame that will be transmitted by repeating its payload in an extended frame, is a standard DVB-S2X VLSNR frame with Spreading BPSK modulation, rate 1/5, for which the required signal to noise ratio (Es/No) is −9.9 dB and the spectral efficiency is 0.075 bits per symbol (corresponding to 0.075 bps/Hz at zero roll-off).

Now, let us assume that this frame is repeated N times in order to form the extended frame, where N is the spreading factor listed at the left-hand column of the table. The time duration for transmitting the extended frames, and consequently the resulting bit rates, correspond to operation at an over 1 MHz channel, using 10% roll-off.

TABLE 1

SNR and Expected Bit Rate over 1 MHz channel, 10% roll-off

| Spreading Factor | Required Es/No [dB] | Extended Frame length | Extended Frame duration [Sec] | Bit rate [Kbps] |
|---|---|---|---|---|
| 1 | −9.9 | 33282 | 0.037 | 68.61 |
| 2 | −12.9 | 66564 | 0.073 | 34.31 |
| 3 | −14.7 | 99846 | 0.110 | 22.87 |
| 4 | −15.9 | 133128 | 0.146 | 17.15 |
| 5 | −16.9 | 166410 | 0.183 | 13.72 |
| 6 | −17.7 | 199692 | 0.220 | 11.44 |
| 7 | −18.4 | 232974 | 0.256 | 9.80 |
| 8 | −18.9 | 266256 | 0.293 | 8.58 |

TABLE 1-continued

SNR and Expected Bit Rate over 1 MHz channel, 10% roll-off

| Spreading Factor | Required Es/No [dB] | Extended Frame length | Extended Frame duration [Sec] | Bit rate [Kbps] |
|---|---|---|---|---|
| 9 | −19.4 | 299538 | 0.329 | 7.62 |
| 10 | −19.9 | 332820 | 0.366 | 6.86 |
| 16 | −21.9 | 532512 | 0.586 | 4.29 |
| 25 | −23.9 | 832050 | 0.915 | 2.74 |
| 40 | −25.9 | 1331280 | 1.464 | 1.72 |
| 64 | −28.0 | 2130048 | 2.343 | 1.07 |
| 100 | −29.9 | 3328200 | 3.661 | 0.69 |

In the following description, several embodiments of the present invention are provided which enable implementing certain improvements to the disclosure provided hereinabove.

Code Shortening and Spreading within a Frame

The frame repetition mechanism may be further combined with code shortening and spreading within each frame. Shortening refers to the procedure by which, instead of transmitting K information bits within a frame, only K-$X_s$ information bits are introduced into the encoder (e.g. BCH+LDPC as in the DVB-S2X standard) led by $X_s$ zero bits. The encoder would then produce $N_{ldpc}$ output bits.

As the codes are systematic (namely, the information bits are outputted as well), the $X_s$ extra zeros may be omitted and not transmitted. Instead, the transmission symbols can be repeated (namely, spread) in order to maintain the same frame size. This way more robust codes can be implemented, especially for supporting lower transmission data blocks, with different shortening sizes.

A Fixed Grid for Pilot Signals and Headers

Known symbols (pilot signals) may be embedded within the transmission frame to enable synchronizations, tracking and channel estimation. Headers are also attached to each frame to provide it with information necessary for its demodulating and decoding. In order to facilitate the receiver's operation, it may be preferred that the headers and pilot signals are transmitted within pre-defined intervals, which in turn would make it possible for the receiver to predict their location even if the number of repetitions varies between various transmitted extended frames.

A preamble comprising known symbols may be added to each frame, thereby facilitating the synchronization process. Since all basic frames have an identical size, an acquisition process may be based upon searching the grid of known preamble sequences.

Once the receiver is synchronized to an extended frame, it may detect the end of such an extended frame, and thus obviously when a new extended frame begins, according to the extended frame type which is encoded in the frames headers. It should be noted that the headers' encoding is designed in a way that the frame type (and consequently the number of repetitions) may be reliably decoded long before the decoding of the extended frame ends.

When a new receiver joins the communication network, it may not be able to recognize the start of an extended frame. Therefore, an "anchor" frame being one frame long and comprising a known sequence of symbols, would preferably be sent on an occasional basis prior to the transmission of a new extended frame. Once the new receiver is locked on the headers preamble grid, it may start searching for an anchor frame that would indicate for the new receiver the beginning of an extended frame.

Figure 2:
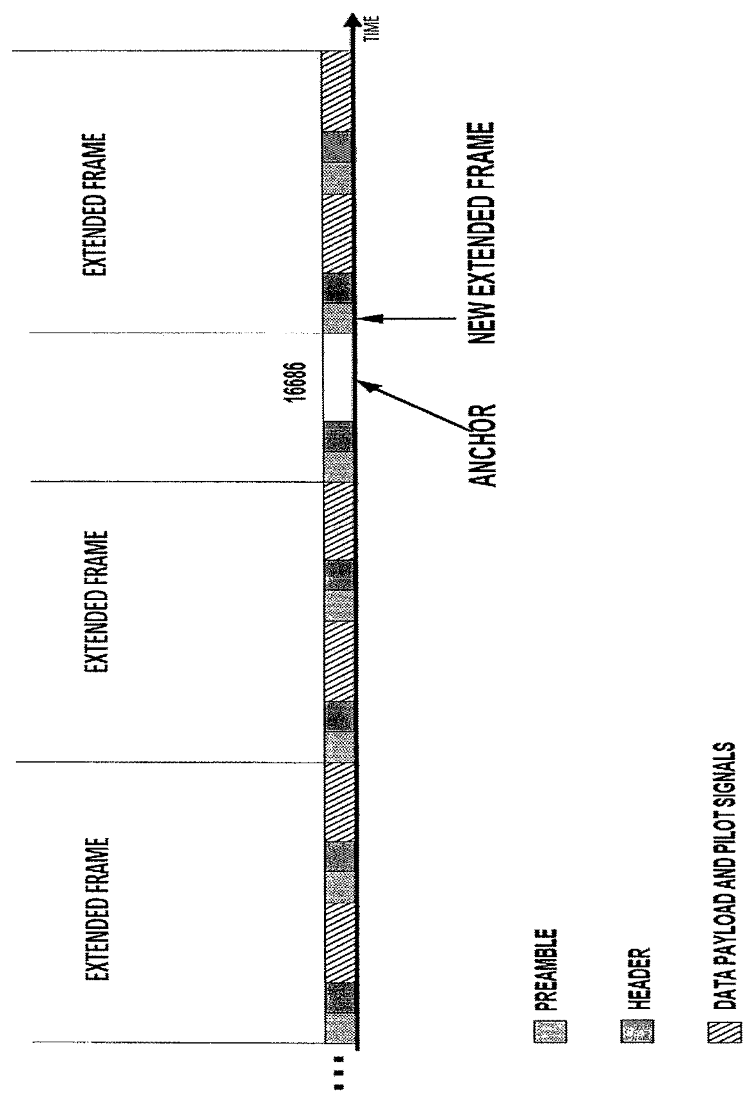
FIG. 2 presents a diagram illustrating an example of a data transmission that comprises an "anchor" frame embedded therein.

Preferably, transmission of such an anchor frame is not carried out too frequently, in order not to reduce the time allocated for transmission of the payload data. FIG. 2 presents a diagram illustrating an example of a data stream comprising an "anchor" frame embedded therein. In the figure a stream composed of continuous transmission of extended frame is depicted. Each extended frame is composed, in this example, of two basic frames. The basic frame is composed of a segment containing data payload and pilots (as detailed in FIG. 1, a header and a preamble, as described above. An anchor frame (of length 16686 symbols in this particular example is inserted between two extended frames, having a length of the data and pilot signal portion of the basic frame.

Improvement of Header Detection

The header of the data carrying frame, e.g. as defined in the DVB-S2/DVB-S2X Standard and the like, carry information which relates to parameters that concern its demodulation, decoding and structure thereof, which makes it possible for the receiver to operate on the received frames. Traditionally, the header is designed in a way that enables its detection under SNR that is even lower than that required to decode the data. In order to provide similar capability under ELSNR conditions, one or more of the following options may be used:

1. Increasing the header length;
2. Combining the header over a set of repeated frames, while storing the symbols.

If the SNR is not too low, the increased header length would enable decoding it by the first frame. However, in case that the SNR is not high enough, the repeated header may be averaged over the frame. In the latter case, the receiver would be able to decode the header after receiving a few frames, but preferably before the aggregated SNR would suffice for decoding of the whole extended frame.

FIG. 1 presents basic frames which are compliant with the DVB-S2/S2X Standard. Such a basic frame has, according to the Standard, a 90 symbols long header (a standard header), followed by the frame's data payload and pilot symbols associated with that basic frame. As discussed above, this basic frame will be transmitted under ELSNR conditions, thus, it will be repeated N−1 times and the basic frame with its N−1 repetitions will be included within an extended basic frame. The basic frame's header is decoded first, and would require less repetitions (M−1) than the number of repetitions required for the data payload (N−1), i.e. M<N. Therefore, in order to implement the method provided by the present invention, there are various ways to do that. Following are number of options (different from the one illustrated in FIG. 1) for carrying out the method provided:

1. Constructing an extended frame which comprises M times the header, where all M header are located consecutively (each header, apart from the first one, is located immediately after a preceding header), followed by repeating N times the data payload of the basic frame;
2. Constructing an extended frame which comprises N times the whole basic frame, including its header. In this option, the header will be detected after the basic frame appears M times in the extended frame (i.e. after having M−1 repetitions of the basic frame).
3. Constructing an extended frame which comprises X repetitions of the standard header (where X<M) times, thereby forming a new header, followed by N−1 repetitions of the new header followed by the data payload. This header which is illustrated in FIG. 1, will be decoded earlier than a header constructed in accordance with the above option 2, under the same conditions.

Identification of the Last Frame

According to an embodiment of the present disclosure, the value of factor N can be made constant. However, according to another embodiment of the disclosure, the value of factor N is flexible and adaptive to various SNR conditions. In order to obtain that flexibility, it is preferably possible to modify the value of factor N. One of the optional methods to achieve this goal, is to use a mechanism which is configured to identify the last frame in an extended frame.

This option may be carried out by implementing a special header that may be identified by the receiver. Some of the possible solutions to do that, are:

- Using a special longer header to enable its detection under ELSNR conditions.
- Using an antipodal header, namely, transmitting a header at the last frame for which the symbols are antipodal to the original header symbol, repeated (N−1) times. With the a-priori information available, detection of whether a frame has the same or a negative polarity to the original one, can be obtained at a high probability.
  - This header can be implemented at the last frame or at the last L frames, in order to increase the probability of its identification.

The "last frame" signaling, enables operation at several levels of operating conditions, at low overhead cost.

Use of Scrambling Sequences

According to another embodiment of the disclosure, scrambling may be applied to the signals (e.g. as described in the DVB-S2/S2X standard), in order to shape them spectrally and to reduce interference from co-channel transmitters. While for Standard complying frames the scrambling is not applied to the header, and is initialized at the beginning of each frame, according to the present embodiment, the scrambling is continued within the extended frame and applied to the headers of each frame contained in the extended frame. The scrambling suppresses the harmonic produced by frame repetition and enables, if the SNR is not too low, to separate between different users, provided that each of the users uses a different sequence for scrambling, similar to the procedure performed when using CDMA (Code Division Multiple Access).

The solution provided by the present disclosure is suitable for operating under such ELSNR conditions at any low data rate communication link, and should not be considered as being limited to sensor networks or remote monitoring mentioned hereinabove.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features.

Variations of embodiments of the present invention that are described and embodiments of the present invention comprising different combinations of features noted in the described embodiments will occur to persons of the art. The scope of the invention is limited only by the following claims.

The invention claimed is:

1. A method for use at one or more links of a communication network along which communications are exchanged under extremely low SNR conditions, said method comprises: transmitting a plurality of extended communication frames, each extended communication frame comprises a plurality of basic frames, wherein each of the plurality of basic frames included in the extended frame comprises the same payload as all other basic frames included in the plurality of basic frames; and transmitting an anchor frame in between at least two of the plurality of extended communication frames, whereby the anchor frame comprises a known sequence of symbols.

2. The method of claim 1, further comprising a step of implementing a code shortening and spreading to at least one of the plurality of basic frames included in the extended communication frame.

3. The method of claim 1, further comprising a step of incorporating headers and pilot signals at pre-defined intervals within the extended communication frame.

4. The method of claim 1, further comprising a step of extending a header length of one or more basic frames included in the extended communication frame.

5. The method of claim 1, further comprising a step of combining header symbols over a number of basic frames, and storing symbols associated with preceding basic frames.

6. The method of claim 1, further comprising a step of identifying a basic frame as being a last basic frame of the extended communication frame.

7. The method of claim 1, further comprising a step of applying a scrambling sequence across the extended communication frame.

8. The method of claim 7, wherein the step of applying a scrambling sequence across the extended communication frame is carried out by refraining from initializing the scrambling sequence at the beginning of basic frames comprised in the extended communication frame.

9. The method of claim 7, wherein an extended communication frame is configured to carry communications received from a number of different users.

10. The method of claim 9, wherein for each of at least two basic frames received from different users, a different scrambling sequence is applied prior to incorporating the respective basic frames within a single extended communication frame.

11. The method of claim 1, comprising incorporating with each basic frame a preamble that comprises a sequence of pre-defined symbols.

12. The method of claim 1, wherein said anchor frame has a length of one basic frame.

13. A transceiver adapted to exchange communications along one or more communication links at which communications are exchanged under extremely low SNR conditions, wherein: the transceiver is configured to transmit a plurality of extended communication frames, each of which comprises a plurality of basic frames, where each of the plurality of basic frames included in a respective extended communication frame comprises the same payload as all other basic frames included in that plurality of basic frames; and wherein the transceiver is configured to transmit an anchor frame in between at least two of the plurality of extended communication frames, whereby said anchor frame comprising a known sequence of symbols enabling a receiver to recognize an extended communication frame following said anchor frame.

14. The transceiver of claim 13, further configured to affect code shortening and spreading to at least one of the plurality of basic frames included in the extended communication frame.

15. The transceiver of claim 13, configured to receive a plurality of extended communication frames, each of which comprises a plurality of basic frames, where each of the plurality of basic frames included in a respective extended communication frame comprises the same payload as all other basic frames included in that plurality of basic frames, and to decode therefrom data payload comprised in the plurality of basic frames included in the extended communication frame.

16. The transceiver of claim 13, configured to incorporate a preamble that comprises a sequence of pre-defined symbols with each basic frame comprised in an extended communication frame that is being transmitted thereby.

17. The transceiver of claim 13, further configured to transmit said anchor frame with a length of at least one basic frame.

* * * * *